United States Patent [19]
Shannon et al.

[11] Patent Number: 6,050,395
[45] Date of Patent: Apr. 18, 2000

[54] KNIFE EDGE CONVERTER

[75] Inventors: Shawn Shannon, Canon City; Rodney Mishmash, Pueblo, both of Colo.

[73] Assignee: Portec, Inc., Toledo, Ohio

[21] Appl. No.: 09/065,325

[22] Filed: Apr. 23, 1998

[51] Int. Cl.[7] .................................................. B65G 15/02
[52] U.S. Cl. ........................................... 198/831; 198/600
[58] Field of Search ..................... 198/600, 831

[56] References Cited

U.S. PATENT DOCUMENTS

| | | | |
|---|---|---|---|
| 1,972,753 | 9/1934 | Bausman | 198/831 X |
| 2,712,378 | 7/1955 | Eggleston | 198/202 |
| 3,206,001 | 9/1965 | Peppler | 198/600 X |
| 4,177,988 | 12/1979 | Camilleri | 273/43 |
| 4,846,338 | 7/1989 | Widmer | 198/831 |
| 4,887,708 | 12/1989 | Brown et al. | 198/831 |
| 4,930,621 | 6/1990 | Brown et al. | 198/831 |
| 5,060,788 | 10/1991 | Compton et al. | 198/831 |
| 5,605,222 | 2/1997 | Huberty et al. | 198/841 |

*Primary Examiner*—James R. Bidwell
*Attorney, Agent, or Firm*—Klaas, Law, O'Meara & Malkin, P.C.; Joseph J. Kelly, Esq.

[57] ABSTRACT

Apparatus for converting a standard non-knife edge conveyor or power turn into a knife edge conveyor or power turn.

20 Claims, 3 Drawing Sheets

KNIFE EDGE CONVERTER

FIELD OF THE INVENTION

This invention relates generally to conveyors and/or power turns and more particularly to apparatus for use in converting a non-knife edge conveyor and/or power turn into a knife edge conveyor and/or power turn.

BACKGROUND OF THE INVENTION

In normal conveyors or power turns, the end rolls thereof have a relatively large diameter so that there exists a transition space when moving from a conveyor to a power turn or vice-versa. In order to reduce this transition space, industry has developed the knife edge conveyor or power turn. However, this solution requires separate manufacturing plans and structures which results in additional expenses. Therefore, it has been desirable to market both knife edge and non-knife edge conveyors and at the same time to do so at reasonable manufacturing costs.

BRIEF DESCRIPTION OF THE INVENTION

This invention provides apparatus for converting a standard non-knife edge conveyor or a power turn into a knife edge conveyor or a knife edge power turn.

The invention is directed to apparatus for use to modify a conventional standard non-knife edge power turn of the prior art wherein the standard non-knife edge power turn comprises at least two shafts mounted at fixed locations on a frame with each of the shafts having a plurality of relatively large diameter rolls rotatably mounted thereon in a spaced apart relationship by a plurality of spacers and having a driven conveyor belt journaled around the relatively large diameter rolls. This invention converts such a standard conventional non-knife edge power turn into a knife edge power turn. It is understood that the term, power turn includes conveyors.

In a preferred embodiment of the invention, the above-described apparatus is changed by providing at least another shaft having a plurality of relatively small diameter rolls rotatably mounted thereon. Mounting apparatus is provided for mounting the at least another shaft so that the relatively small diameter rolls are in a spaced apart relationship to the relatively large diameter rolls. The mounting apparatus comprises a plurality of support plates, preferably three in number, with each of the support plates having opposite end portions and each of the opposite end portions having an opening formed therein. The one end portions of the plurality of support plates are mounted on the at least another shaft in a spaced apart relationship with the relatively small diameter rolls on each side thereof. The other end portions of the support plates are mounted at fixed locations in a spaced apart relationship on each of the at least two shafts. Each other end portion of the support plates replaces one of the spacers.

The one end portions are secured to the at least another shaft by any suitable means, such as by welding or set screws. The other end portions are secured to the one of the at least two shafts by suitable means, such as set screws. A plurality of threaded openings are formed in each of the at least two shafts in a spaced apart axial alignment. Each of the other end portions of the support plates has a threaded opening formed therein. A threaded screw extends through the threaded opening in each of the support plates into one of the threaded openings in each of the at least two shafts.

The opposite ends of each of the at least two shafts are mounted in inner and outer sidewalls of the support frame for the power turn or conveyor. The opposite ends are secured in a fixed position so that both the relatively large diameter rolls and the relatively small diameter rolls are in contact with the conveyor belt or only the relatively small diameter rolls are in contact with the conveyor belt. In any mounting, the conveyor belt is journaled around the relatively small diameter rolls.

BRIEF DESCRIPTION OF THE DRAWINGS

An illustrative and presently preferred embodiment of the invention is illustrated in the accompanying drawings in which.

DETAILED DESCRIPTION OF THE INVENTION

Figure 1:
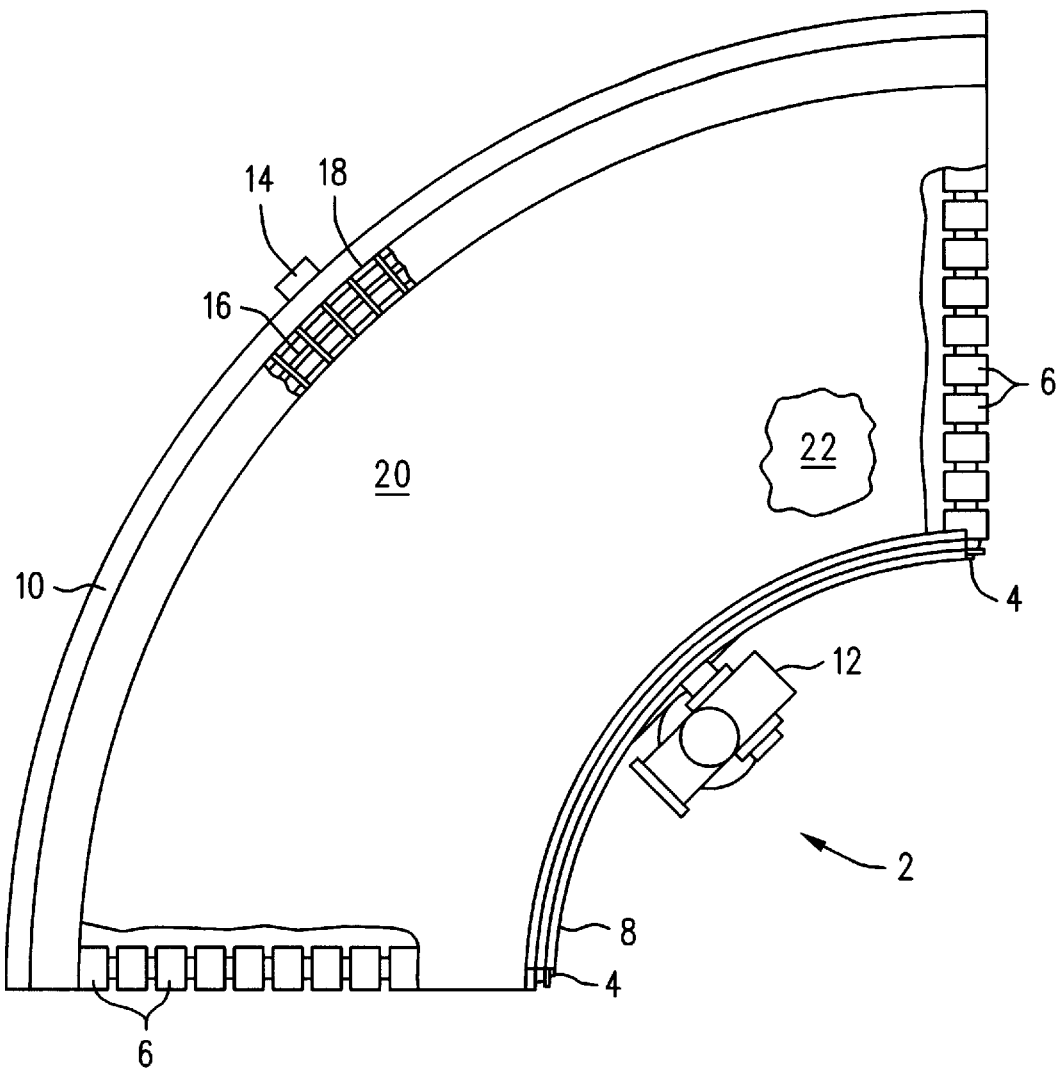
FIG. 1 is a schematic top plan view of a ninety degree power turn of the prior art.
Figure 2:
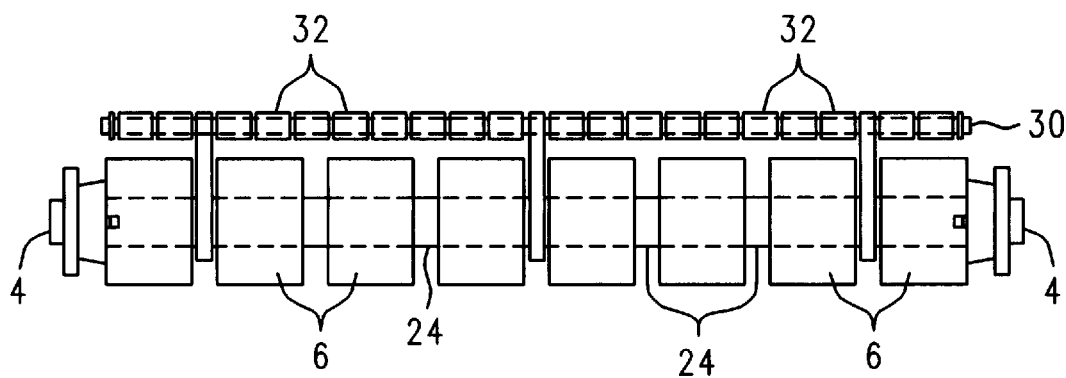
FIG. 2 is a top plan view of a modification of one end portion of FIG. 1 in accordance with this invention with parts removed.

In FIG. 1, there is illustrated a conventional non-knife edge ninety degree power turn 2. It is understood that the power turn of FIG. 1 is for illustration purposes only and could be of forty-five degrees; one hundred and thirty-five degrees or a straight conveyor. A somewhat similar power turn is illustrated in U.S. Pat. No. 4,930,621 to Brown et al., which is incorporated herein by reference thereto. The power turn 2 has a shaft 4 at each end thereof on which are mounted a plurality of spaced apart rotatable relatively large diameter rolls 6. The power turn 2 is mounted on an inner sidewall 8 and an outer sidewall 10. A drive motor 12 is mounted on the inner sidewall 8 and drives a shaft 14 which is supported by structures in the inner sidewall 8 and the outer sidewall 10. A drive gear 16 is mounted on the shaft 14 for rotation therewith. The drive gear 16 drives an endless chain 18 which has a conveyor belt 20 secured thereto by conventional means. It is understood that the power turn in FIG. 1 is for illustration purposes only and can be of other constructions. For example, the conveyor belt 20 can be driven by other apparatus. As illustrated in FIGS. 1 and 2, the conveyor belt 20 is journaled around the relatively large diameter rolls 6 and is supported by a plate 22 that extends between the inner sidewall 8 and the outer sidewall 10. The rolls 6 are held in a spaced apart relationship by spacers 24.

Figure 3:
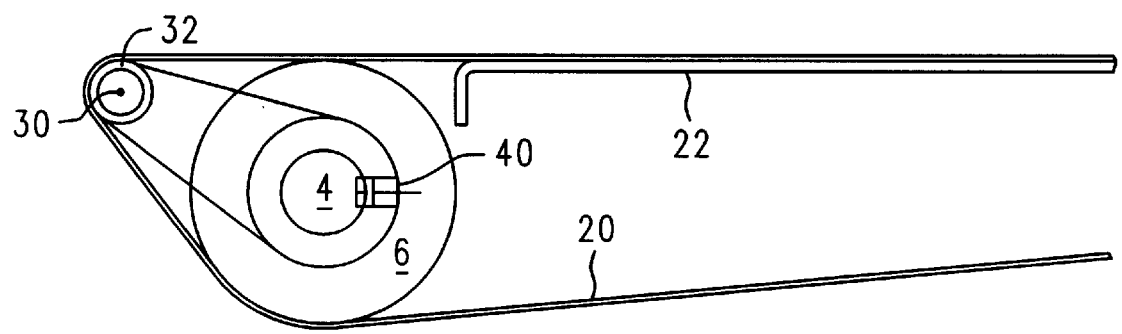
FIG. 3 is a side elevational view of FIG. 2.
Figure 4:
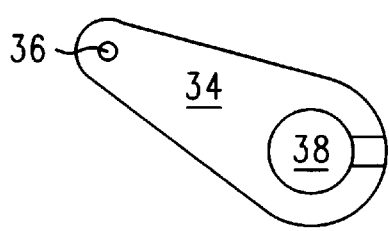
FIG. 4 is a side elevational view of a support plate of this invention.
Figure 5:
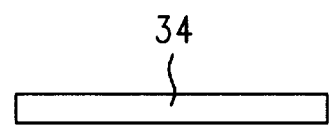
FIG. 5 is a top plan view of FIG. 4.
Figure 6:
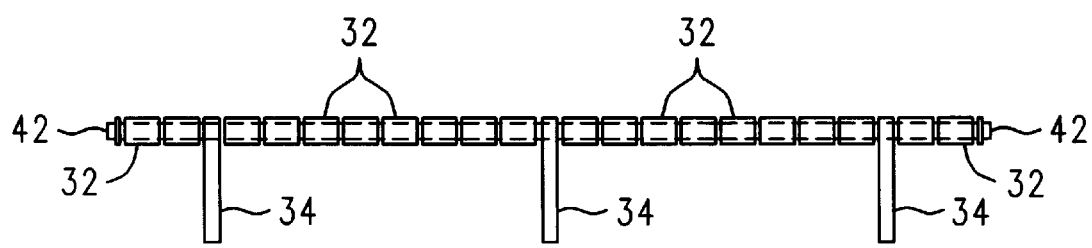
FIG. 6 is a front elevational view of the knife edge rolls and support plates of this invention.
Figure 7:
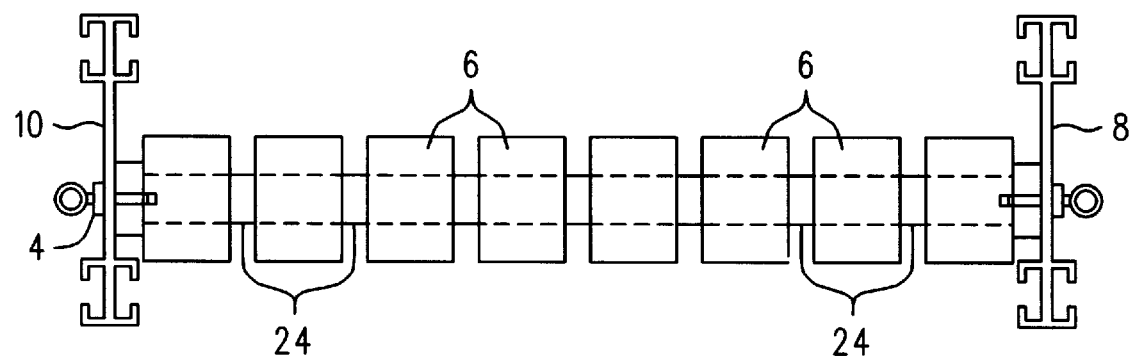
FIG. 7 is a front elevational view of the relatively large diameter rolls of FIG. 1.
Figure 8:
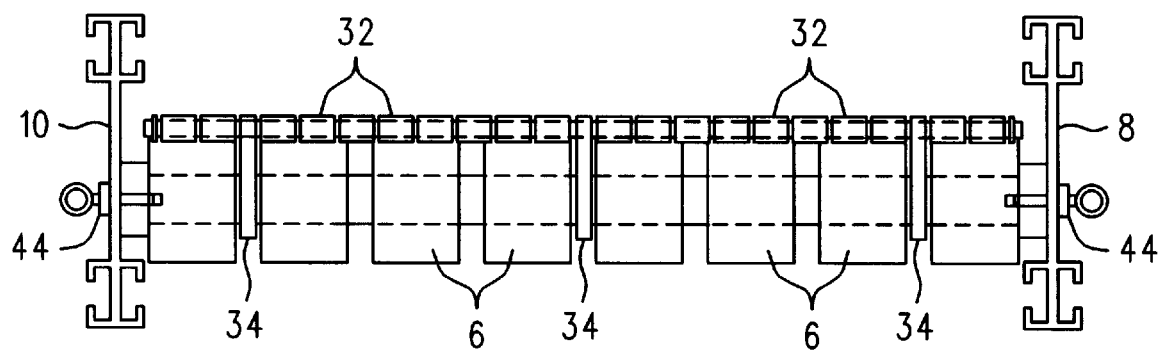
FIG. 8 is a front elevational view of FIG. 2.

The invention of this application is illustrated in FIGS. 2–6 and 8 and comprises a shaft 30 having a plurality of relatively small diameter rolls 32 mounted for rotation thereon. If desired, the rolls 32 may be mounted on bearings secured to the shaft 30 in a spaced apart relationship. A plurality of support plates 34, preferably three in number, are located on the shaft 30 at spaced apart fixed locations by conventional means, such as by welding, set screws or other structures. As illustrated in FIG. 6, the support plates 34 are located between adjacent rolls 32. A support plate 34 is illustrated in FIGS. 4 and 5 and has an opening 36 through which the shaft 30 passes and another opening 38 through which the shaft 4 passes. As illustrated in FIG. 3, the support plate 34 is secured to the shaft 4 by a set screw 40 threadedly connected in threaded openings (not shown) in the support plate 34 and the shaft 4. Other conventional apparatus may be used to secure the support plates 34 on the shaft 4. Each support plate 34 is secured to the shaft 30 by suitable conventional means, such as by welding, set screws or other structures, so that the shaft 30 does not rotate relative to the support plate 34. In a preferred embodiment, support plates 34 are secured to shafts 4 at each end of the power turn 2 although in some embodiments only one end is converted to a knife edge.

In a preferred embodiment of the invention, as illustrated in FIGS. 2 and 6–8, three support plates 34 are used to convert a standard non-knife edge power turn into a knife edge power turn. In assembly, a support plate 34 is moved over the shaft 30 to approximately the center thereof and then secured to the shaft 30 as described above so that there is no relative rotational movement between the support plate 34 and the shaft 30. A plurality of small diameter rolls 32 are then moved over the shaft 30 until they are adjacent each side of the center support plate 34. The small diameter rolls 32 rotate relative to the shaft 30. Another support plate 34 is then moved over the opposite ends of the shaft 30 and secured thereto as described above. Finally, additional small diameter rolls 32 are moved over the opposite ends of the shaft 30 for rotation relative thereto. Suitable apparatus 42, such as threaded nuts in threaded contact with the opposite threaded ends of the shaft 30 hold the small diameter rolls 32 in place.

The relatively large diameter rolls 6 are assembled on the shaft 4 by moving the shaft 4 through an opening in either of the inner or outer sidewalls 8 and 10 and then through a spacer 24 and a relatively large diameter roll 6. The shaft 4 is then passed through the opening 38 in the first support plate 34 and then successively through a plurality of spacers 24, relatively large diameter rolls 6 and the remaining support plates 34 and spacers 24 then through an opening in the other of the inner and outer sidewalls 8 and 10. The shaft 4 is rotated relative to the support plates 34 until threaded openings in the shaft 4 (not shown) and the support plates 34 are aligned. The support plates 34 are then secured to the shaft 4 by set screws 40 so that there is no relative movement between the shaft 4 and the support plates 34. The opposite ends of the shaft 4 are secured at a fixed location in each of the inner and outer sidewalls 8 and 10 by suitable mounting apparatus 44.

In FIG. 3, both the relatively large diameter rolls 6 and the relatively small diameter rolls 32 are in contact with the conveyor belt 20. However, in accordance with this invention the relatively large diameter rolls 6 do not have to be in contact with the conveyor belt 20. The relatively small diameter rolls are located so that the conveyor belt 20 can be journaled around them. The location of the relatively small diameter rolls 32 depends on the fixed location of the opposite ends of the shafts 4 in the inner and outer sidewalls 8 and 10.

It is contemplated that the inventive concepts herein described may be variously otherwise embodied and it is intended that the appended claims be constructed to include alternative embodiments of the invention except insofar as limited by the prior art.

What is claimed:

1. Apparatus for converting a standard power turn, comprising at least two shafts mounted at a fixed location on a frame and each having a plurality of relatively large diameter rolls, rotatably mounted thereon and held in a spaced apart relationship by a plurality of spacers and having a driven conveyor belt journaled around the plurality of rolls on the at least two shafts, into a knife edge power turn comprising:

at least another shaft having another plurality of rolls, rotatably mounted thereon in a spaced apart relationship;

each of said another plurality of rolls having a relatively small diameter;

a plurality of support plates each having opposite end portions;

each of said opposite end portions having an opening formed therein;

the one end portions of said plurality of support plates being mounted at fixed locations and in a spaced apart relationship on said at least another shaft; and the other end portions of said plurality of support plates being mounted at fixed locations and in a spaced apart relationship on one of said at least two shafts.

2. Apparatus as in claim 1 wherein said plurality of support plates comprise:

at least three support plates.

3. Apparatus as in claim 1 and further comprising:

said at least one of said two shafts having a plurality of threaded openings formed therein and in spaced apart axial alignment;

each of said other end portions having a threaded opening formed therein to be placed in alignment with said threaded openings in said two shafts; and threaded screw threaded into said threaded opening in each of said other end portions and extending into threaded engagement with one of said threaded openings in said at least one of said two shafts.

4. Apparatus as in claim 3 wherein said plurality of support plates comprise:

at least three support plates.

5. Apparatus as in claim 4 and further comprising:

mounting apparatus for mounting one of said at least two shafts at a fixed location so that said conveyor belt is journaled around said relatively small diameter rolls.

6. Apparatus as in claim 5 wherein:

said one of said at least two shafts being mounted at a fixed location so that said relatively large diameter rolls and said relatively small diameter rolls are in contact with said conveyor belt.

7. Apparatus as in claim 5 wherein:

said one of said at least two shafts being mounted at a fixed location so that only said relatively small diameter rolls are in contact with said conveyor belt.

8. Apparatus as in claim 1 and further comprising:

mounting apparatus for mounting one of said at least two shafts at a fixed location so that said conveyor belt is journaled around said relatively small diameter rolls.

9. Apparatus as in claim 8 wherein:

said one of said at least two shafts is mounted at a fixed location so that said relatively large diameter rolls and said relatively small diameter rolls are in contact with said conveyor belt.

10. Apparatus as in claim 8 wherein:

said one of said at least two shafts is mounted at a fixed location so that only said relatively small diameter rolls are in contact with said conveyor belt.

11. Apparatus for converting a standard power turn, comprising at least two shafts mounted at a fixed location on a frame and each having a plurality of relatively large diameter rolls, rotatably mounted thereon and held in a spaced apart relationship by a plurality of spacers and having a driven conveyor belt journaled around the plurality of rolls on the at least two shafts, into a knife edge power turn comprising:

another two shafts, each having another plurality of rolls rotatably mounted thereon in a spaced apart relationship;

each of said another plurality of rolls having a relatively small diameter;

a plurality of support plates, each having opposite end portions;

each of the opposite end portions having an opening formed therein;

the one end portions of said plurality of support plates being mounted at fixed locations and in a spaced apart relationship on each of said another two shafts; and the other end portions of said plurality of support plates being mounted at fixed locations in a spaced apart relationship on each of said at least two shafts.

12. Apparatus as in claim 11 wherein said plurality of support plates comprise:

at least three support plates on each of said another two shafts.

13. Apparatus as in claim 12 and further comprising:

each of said at least two shafts having a plurality of threaded openings formed therein and in spaced apart axial alignment;

each of said other end portions having a threaded opening formed therein to be placed in alignment with said threaded openings in each of said at least two shafts; and a threaded screw threaded into said threaded opening in each of said other end portions and extending into threaded engagement with one of said threaded openings in said at least two shafts.

14. Apparatus as in claim 13 wherein said plurality of support plates comprise:

at least three support plates on each of said another two shafts.

15. Apparatus as in claim 14 and further comprising:

mounting apparatus for mounting each of said at least two shafts at a fixed location so that said conveyor belt is journaled around said relatively small diameter rolls.

16. Apparatus as in claim 15 wherein:

said at least two shafts being mounted at a fixed location so that said relatively large diameter rolls and said relatively small diameter rolls are in contact with said conveyor belt.

17. Apparatus as in claim 15 wherein:

said at least two shafts being mounted at a fixed location so that only said relatively small diameter rolls are in contact with said conveyor belt.

18. Apparatus as in claim 11 and further comprising:

mounting apparatus for mounting each of said at least two shafts at a fixed location so that said conveyor belt is journaled around said relatively small diameter rolls.

19. Apparatus as in claim 18 wherein:

said at least two shafts being mounted at a fixed location so that said relatively large diameter rolls and said relatively small diameter rolls are in contact with said conveyor belt.

20. Apparatus as in claim 18 wherein:

said at least two shafts being mounted at a fixed location so that only said relatively small diameter rolls are in contact with said conveyor belt.

* * * * *